US012562499B2

(12) United States Patent
Rashidian

(10) Patent No.: US 12,562,499 B2
(45) Date of Patent: Feb. 24, 2026

(54) DUAL-BAND PHASED ARRAY ANTENNA ASSEMBLY

(71) Applicant: PERASO TECHNOLOGIES INC., Toronto (CA)

(72) Inventor: Atabak Rashidian, Richmond Hill (CA)

(73) Assignee: PERASO TECHNOLOGIES INC., Toronto (CA)

( * ) Notice: Subject to any disclaimer, the term of this patent is extended or adjusted under 35 U.S.C. 154(b) by 72 days.

(21) Appl. No.: 18/541,519

(22) Filed: Dec. 15, 2023

(65) Prior Publication Data

US 2024/0204419 A1 Jun. 20, 2024

Related U.S. Application Data

(60) Provisional application No. 63/387,545, filed on Dec. 15, 2022.

(51) Int. Cl.
*H01Q 21/06* (2006.01)
*H01Q 9/04* (2006.01)

(52) U.S. Cl.
CPC ......... *H01Q 21/065* (2013.01); *H01Q 9/0414* (2013.01)

(58) Field of Classification Search
CPC .. H01Q 9/0414; H01Q 9/0435; H01Q 9/0464; H01Q 21/065
See application file for complete search history.

(56) References Cited

U.S. PATENT DOCUMENTS

2019/0089057 A1* 3/2019 Mitchell .................. H01Q 5/42
2023/0104894 A1* 4/2023 Adams ................. H01Q 9/0464 343/702

FOREIGN PATENT DOCUMENTS

EP 3742552 A1 * 11/2020 ............... H01Q 5/35

* cited by examiner

*Primary Examiner* — Daniel Munoz
(74) *Attorney, Agent, or Firm* — Perry + Currier Inc.

(57) ABSTRACT

An antenna assembly includes: a substrate material supporting a plurality of substantially parallel conductive layers; a ground plane defined by a first conductive layer; an grid of antenna elements, each antenna element including: an excitation patch defined by a second conductive layer, and configured for connection to a controller port; a first annular radiative element defined by a third conductive layer; a second annular radiative element defined by a fourth conductive layer; wherein the excitation patch, the first annular radiative element, and the second annular radiative element are disposed in a stack with an axis perpendicular to the first conductive layer.

8 Claims, 5 Drawing Sheets

DUAL-BAND PHASED ARRAY ANTENNA ASSEMBLY

CROSS-REFERENCE TO RELATED APPLICATIONS

This application claims priority to U.S. Provisional Patent Application No. 63/387,545, filed Dec. 15, 2022, the contents of which is incorporated herein by reference.

FIELD

The specification relates generally to wireless communications, and specifically to dual-band phased array antenna assemblies.

BACKGROUND

Certain wireless communications standards, such as the 5G standard, define a variety of frequency bands for use by devices implementing such standards. Implementing hardware elements such as antenna assemblies that provide sufficient coverage of such frequency bands may be impeded by the cost and/or complexity of the assemblies. As a result, some antenna assemblies provide only partial coverage of the standard's frequency bands.

SUMMARY

Examples disclosed herein are directed to an antenna assembly, comprising: a substrate material supporting a plurality of substantially parallel conductive layers; a ground plane defined by a first conductive layer; an grid of antenna elements, each antenna element including: an excitation patch defined by a second conductive layer, and configured for connection to a controller port; a first annular radiative element defined by a third conductive layer; a second annular radiative element defined by a fourth conductive layer; wherein the excitation patch, the first annular radiative element, and the second annular radiative element are disposed in a stack with an axis perpendicular to the first conductive layer.

Additional examples disclosed herein are directed to an antenna element, comprising: a ground plane defined by a first conductive layer; an excitation patch defined by a second conductive layer, and configured for connection to a controller port; a first annular radiative element defined by a third conductive layer; a second annular radiative element defined by a fourth conductive layer; wherein the excitation patch, the first annular radiative element, and the second annular radiative element are disposed in a stack with an axis perpendicular to the first conductive layer.

BRIEF DESCRIPTIONS OF THE DRAWINGS

Embodiments are described with reference to the following figures.

DETAILED DESCRIPTION

Figure 1A:
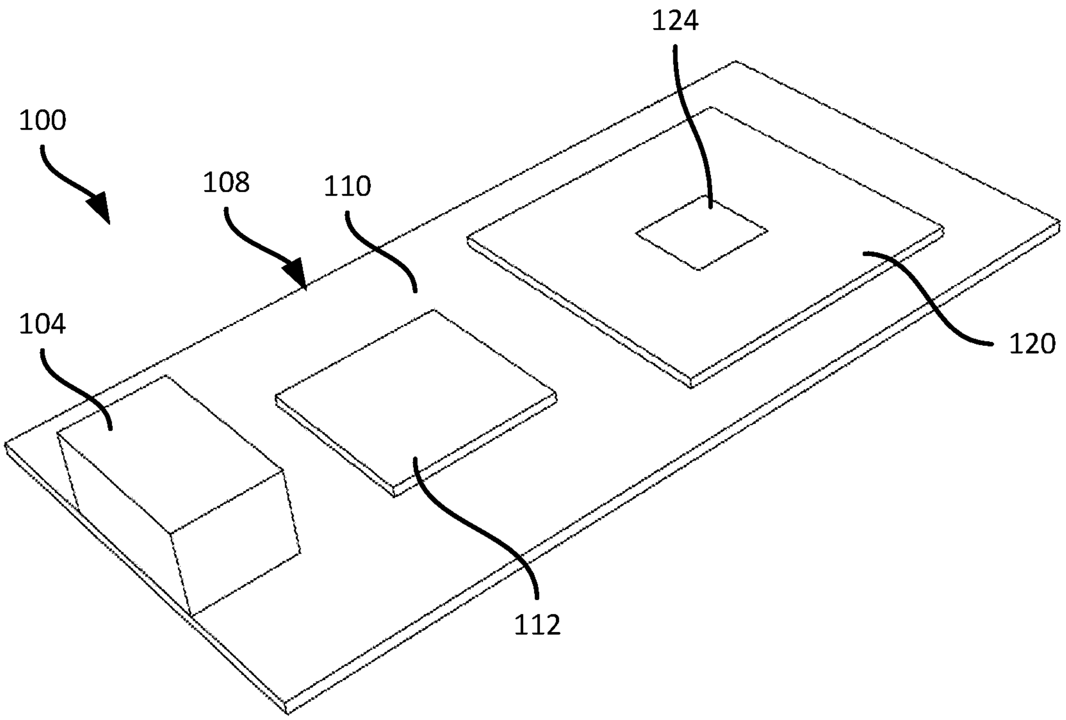
FIG. 1A is a diagram illustrating a radio frequency module viewed from a first side.

FIG. 1A depicts an example wireless communications assembly 100, also referred to as a radio frequency (RF) module 100 or simply the module 100, in accordance with the teachings of this disclosure. The module 100, in general, is configured to enable wireless data communications between computing devices (not shown). In the present example, the wireless data communications enabled by the module 100 are conducted according to the fifth generation (5G) standard, e.g., using at least a portion of the FR2 set of frequency bands defined by the 5G standard. The module 100 can, in other words, enable wireless communications at frequencies of between about 24.25 GHZ (e.g., the lower bound of the n258 band, also referred to as the K-band), and about 43.5 GHZ (e.g., the upper bound of the n259 band, also referred to as the V-band). The module 100 further implements a band stop between about 29.5 GHZ and about 37 GHZ (e.g., the upper bound of the n257 band, and the lower bound of the n260 band), which 5G FR2 does not use.

Antenna assemblies configured to communicate via standards such as 5G may be subject to competing constraints, including fabrication tolerances, production cost and complexity, and performance requirements. Enabling sufficient performance (e.g., a gain of at least 12 dBi, purely as an illustrative example) across the frequency range mentioned above (e.g., from 24.25 GHz to 43.5 GHz with a band stop from 29.5 GHz to 37 GHZ) may lead to increased complexity and/or cost. Some antenna assemblies do not enable use of the full range of frequency bands noted above, instead providing coverage only below the band stop, only above the band stop, or only across a portion of the ranges above and below the band stop. As will be described below, the module 100 includes an antenna assembly that enables wireless communications (e.g., with realized gain above 12 dBi) across the full range set out above.

The module 100 can be integrated with a computing device, or in other examples, can be implemented as a discrete device that is removably connected to a computing device. In examples in which the module 100 is configured to be removably connected to a computing device, the module 100 includes a communications interface 104, such as a Universal Serial Bus (USB) port, configured to connect the remaining components of the module 100 to a host computing device (not shown).

The module 100 includes a primary board 108, which may also be referred to as a primary support. In the present example, the primary board 108 is a printed circuit board (PCB), for example fabricated with FR4 or other suitable substrate material, carrying either directly or via additional boards, the remaining components of the module 100. In particular, the primary board 108 carries, e.g., on a first surface 110 thereof, the above-mentioned communications interface 104. In other examples, the primary board 108 can be integrated into a computing device such as a smartphone or the like, and the communications interface 104 can be omitted.

The primary board 108 also carries, on the surface 110, a baseband controller 112. The baseband controller 112 is implemented as a discrete integrated circuit (IC) in the present example, such as a field-programmable gate array (FPGA). In other examples, the baseband controller 112 may be implemented as two or more discrete components. In further examples, the baseband controller 112 can be integrated within the primary board 108 rather than carried on the upper surface 110.

In the present example, the baseband controller 112 is connected to the primary board 108 via any suitable surface-mount package, such as a ball-grid array (BGA) package that electrically couples the baseband controller 112 to signal paths (also referred to as leads, traces and the like) formed within the primary board 108 and connected to other components of the module 100. For example, the primary board 108 defines signal paths (not shown) between the baseband controller 112 and the communications interface 104. Via such signal paths, the baseband controller 112 transmits data received at the module 100 to the communications interface for delivery to a host computing device, and also receives data from the host computing device for wireless transmission by the module 100 to another computing device. Further, the primary board 108 defines additional signals paths extending between the baseband controller 112 and further components of the module 100, to be discussed below.

The module 100 further includes an interposer 120 carrying a radio controller 124, also referred to as a beamforming controller. The interposer 120 is a discrete component mounted on the upper surface 110 via a suitable surface-mount package (e.g., BGA). The interposer 120 itself carries the controller 124, and contains signal paths (also referred to as feed lines) for connecting control ports of the controller 124 to the baseband controller 112, and for connecting further control ports of the controller 124 to antenna elements to be discussed in greater detail below. The controller 124 may, for example, be placed onto or into the interposer 120 via a pin grid array (PGA) or other suitable surface-mount package. In other examples, the controller 124 can be mounted directly to the primary support 108, and the interposer 120 can be omitted. In still further examples, the controllers 112 and 124 can be implemented in a single chip.

The module 100 can include a heatsink (not shown) placed over the baseband controller 112, the interposer 120 and the controller 124, and in contact with upper surfaces of those components, e.g., to exhaust heat generated by the components. In other examples, separate heat sinks may be placed over the baseband controller 112, and the combination of the interposer 120 and radio controller 124.

The controller 124 includes a transmitting port and a receiving port for connection, via the interposer 120 and traces defined by the primary board 108, to the baseband controller 112. The radio controller 124 also includes a plurality of antenna ports for connection, via the interposer 120, to corresponding radio control contacts on the surface 110 of the primary board 108. Those contacts, in turn, are connected to elements on the opposing surface of the primary board 108, to carry signals between the controller 124 and the above-mentioned antenna elements.

Figure 1B:
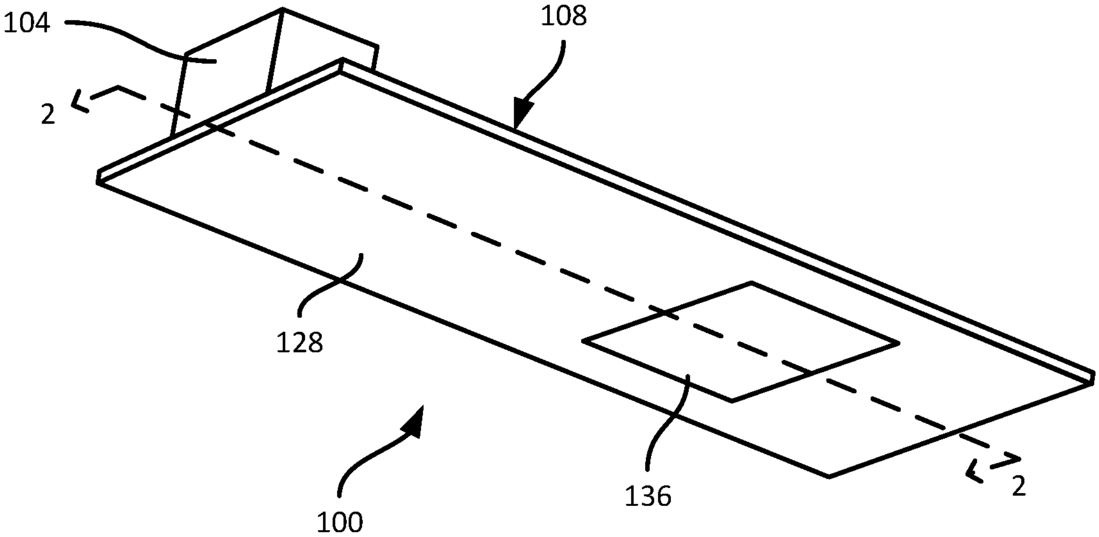
FIG. 1B is a diagram illustrating the radio frequency module of FIG. 1A, viewed from a second side.

Turning to FIG. 1B, an opposing surface 128 of the primary board 108 is shown. At a region 132 of the surface 128, the module 100 includes an antenna assembly 136

The above-mentioned antenna elements, such as a phased array of sixteen antenna elements (although other arrangements of antenna elements are also contemplated), are supported on a secondary board 150, also referred to as a secondary support 150. The secondary board 150 includes an outer surface 154 (i.e. a surface facing away from the primary board 108) and an opposing inner surface (not visible in FIG. 1B) facing the primary board 108, and specifically, facing towards the lower surface 128 of the primary board 108. The antenna elements may be supported on the inner surface of the secondary board 150 in the present example. In other examples, however, the antenna elements may be supported on the outer surface 154 of the secondary board 150.

Figure 2:
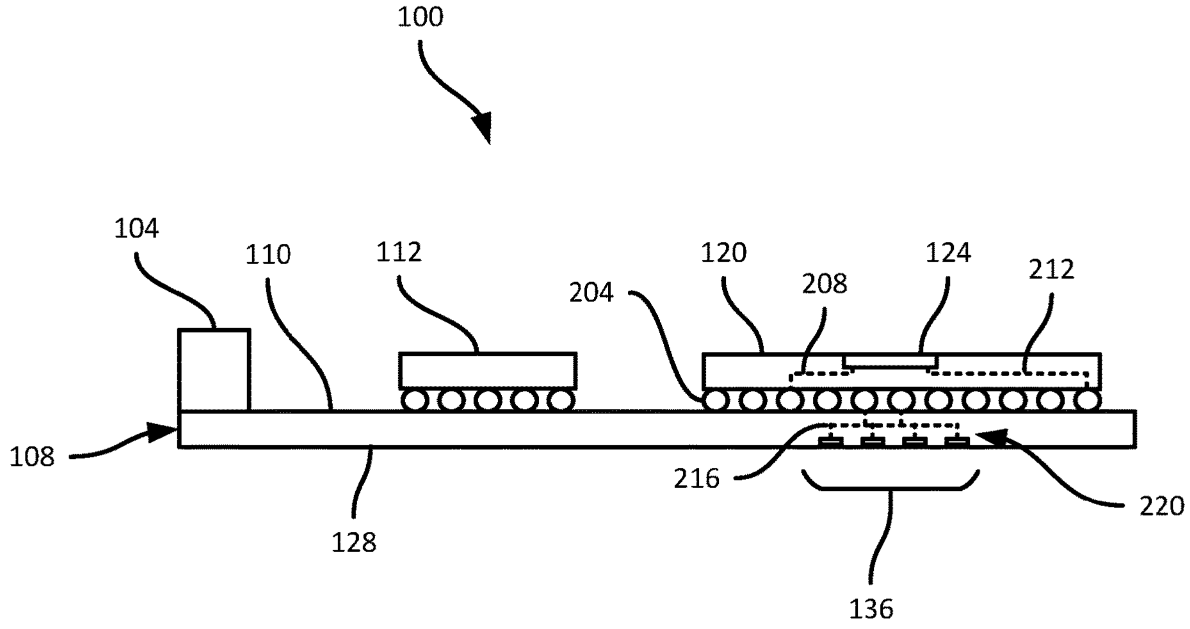
FIG. 2 is a cross sectional view of the module of FIGS. 1A and 1B.

Turning to FIG. 2, the cross-section 2-2 indicated in FIG. 1B is illustrated. As seen in FIG. 2, the interposer 120 is connected to the surface 110 via a surface-mount package 204, which in the present example is a BGA package. The interposer 120 contains a plurality of internal feed lines, examples 208 and 212 of which are shown in FIG. 2, connecting control ports of the radio controller 124 to elements of the package 204 for electrical connection with control contacts on the upper surface 110. At least a portion of the control contacts on the upper surface 110 are connected to conduits 216 extending through the primary board 108 from the surface 110 towards the surface 128.

The conduits 216, also referred to as a feed network, convey signals from the radio controller 124 to a series of excitation patches or other antenna patch control elements of an antenna assembly 220 disposed on or adjacent to the surface 128, within the region 136 shown in FIG. 1B. The structure of the antenna assembly 220 will be described in greater detail below. The antenna assembly 220 can be integrated within the primary board 108. For example, the primary board 108 can include a twelve-layer PCB, with the eight layers closest to the surface 128 defining the antenna assembly 220. In other examples, the antenna assembly 220 can be implemented on a separate PCB affixed to the surface 128.

Figure 3:
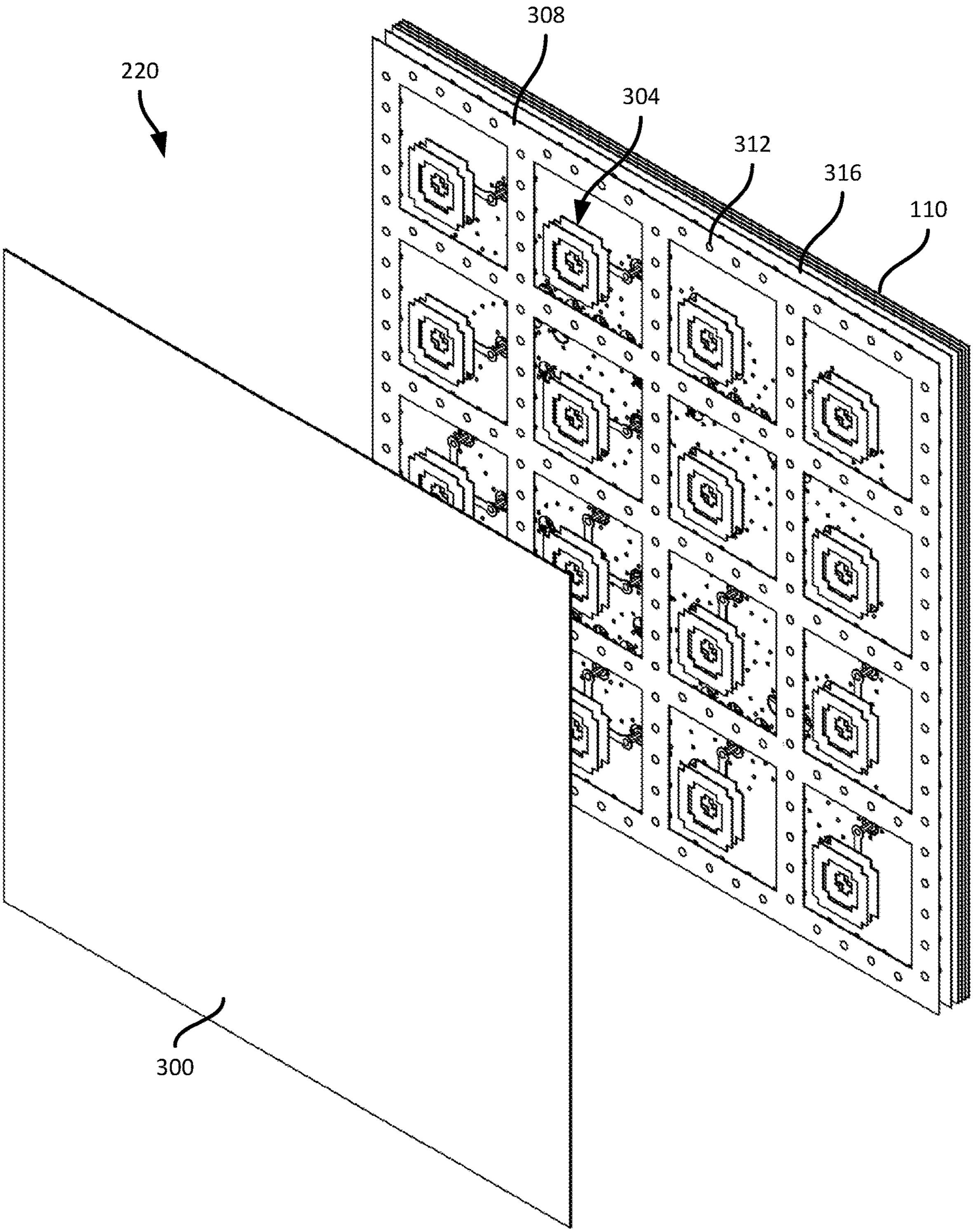
FIG. 3 is a diagram illustrating an antenna assembly of the module of FIGS. 1A and 1B in isolation.

Turning to FIG. 3, the antenna assembly 220 is shown in isolation. More specifically, a segment of the primary board 108, encompassed by the region 136, is illustrated. An outermost layer of the board 108 forms the surface 110, and a protective coating 300 over the antenna assembly 220, e.g., a layer of solder mask or the like, forms a portion of the surface 128. The dielectric substrate of the board 108 is omitted in the illustrated of FIG. 3, leaving the conductive portions of the board 108 visible and arranged in layers. In some examples, the board 108 includes twelve conductive layers, of which four (e.g., beginning at the surface 110) define the feed network for the antenna assembly 220 (e.g., the conduits 216) and various other elements of the module 100. The remaining eight layers (e.g., those closest to the surface 128), in this example, define the antenna assembly 220. It will be apparent to those skilled in the art, however, that outside of the region 136, those eight layers can also define other components of the module 100.

The protective coating 300 is shown removed from the remainder of the antenna assembly 220 to reveal certain features of the antenna assembly 220. The assembly 220 includes a plurality of antenna elements 304, described further below. In this example, the assembly 220 includes sixteen elements 304, each with similar structural features (e.g., with identical structural features in this embodiment) and arranged in a four-by-four array with equal spacing between each adjacent pair of elements 304.

The assembly 220 also includes a grounded boundary structure 308 surrounding each element 304. The boundary 308 can be implemented, as shown in FIG. 3, as a single continuous member of conductive material extending around and between each of the elements 304, forming a grid. The boundary 308 is grounded, e.g., by a plurality of vias 312 extending from the boundary 308 to a ground plane 316 defined by one of the conductive layers (e.g., the fifth conductive layer from the surface 110).

Figure 4:
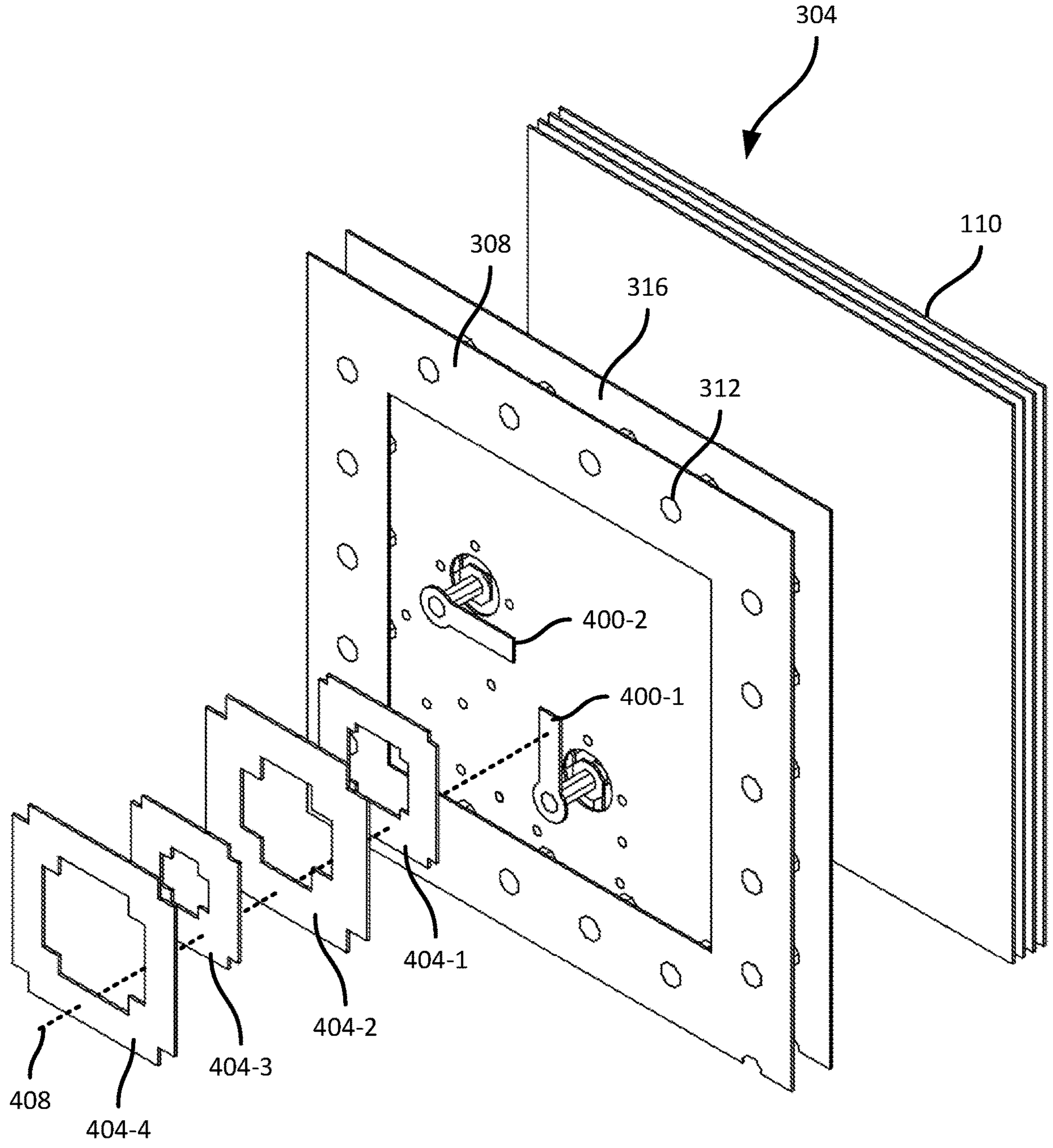
FIG. 4 is an exploded view of one antenna element of the assembly of FIG. 3.

Turning to FIG. 4, an antenna element 304 is shown in isolation, in an exploded view. Features of the first four conductive layers, beginning from the surface 110, are omitted for simplicity of illustration. The element 304 includes an excitation patch 400-1, also referred to as a launcher, defined by a layer distinct from the ground plane 316. For example, the launcher 400-1 can be defined by the conductive layer adjacent to the ground plane 316. In this example, the element 304 also includes a second launcher 400-2, orthogonal to the launcher 400-1, to implement a dual-polarized antenna element. When dual launchers 400 are provided, the launchers 400 can be defined by the same conductive layer. As will be apparent, the launchers 400 are configured for connection to ports of the controller 124, via the above-mentioned feed network.

The element 304 further includes a first annular radiative element 404-1, and a second annular radiative element 404-2, defined by respective conductive layers. For simplicity, the annular radiative elements 404 are also referred to herein as rings 404. The first ring 404-1 can, for example, be defined by the next conductive layer after the layer defining the launchers 400 (e.g., the seventh layer from the surface 110), and the second ring 404-2 can be defined by the subsequent conductive layer (e.g., the eighth layer from the surface 110). The boundary 308, in this example, is defined by the same conductive layer as the launchers 400, although in other embodiments the boundary 308 can be defined by a "higher" layer (e.g., closer to the surface 128) than the launchers. The first ring 404-1 in such embodiments can be on the same layer as the boundary 308, or on the next layer.

Some examples can include only two rings. The present example, however, also includes a third ring 404-3, and a fourth ring 404-4. As with the rings 404-1 and 404-2, the rings 404-3 and 404-4 are defined by successive conductive layers. In some examples, the rings 404-3 and 404-4 can be separated from the rings 404-1 and 404-2 by one or more "empty" conductive layers, e.g., depending on the desired spacing between rings 404. For example, the ring 404-3 can be on a layer separated from the ring 404-2 by one or two "empty" conductive layers.

As will be apparent from FIG. 4, the launchers 400 and the rings 404 are disposed in a stack perpendicular to the conductive layers of the board 108. For example, an axis 408 perpendicular to the ground plane 316 (and therefore also to the other conductive layers) traverses each of the launcher 400-1 and the rings 404. Similarly, another axis perpendicular to the ground plane 316 intersects the launcher 400-2 and each of the rings 404.

Figure 5:
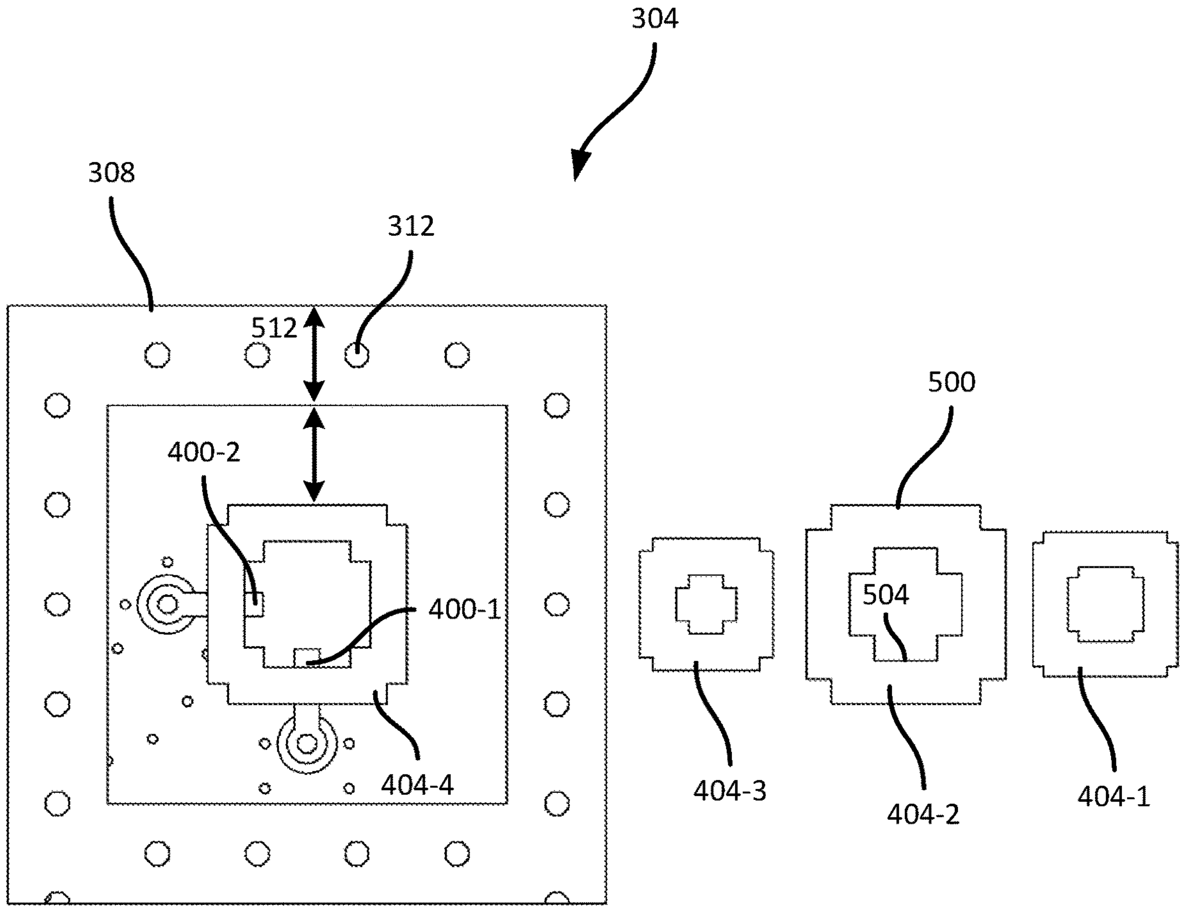
FIG. 5 is another diagram of the antenna element of FIG. 4.

Turning to FIG. 5, a front view of the element 304 is shown, with the rings 404 shown out of the stacked arrangement for easier comparison of the shapes and sizes of the rings 404. As seen from FIG. 5, each ring 404 in this example has an outer perimeter 500 (labelled on the ring 404-2, although it will be understood that each ring 404 has outer and inner perimeters) with a cross shape, and a substantially constant width separating the outer perimeter 500 from an inner perimeter 504, which also has a cross shape. The total length of the perimeters 500 may vary between rings 404. The rings 404 can have substantially constant widths, although in some embodiments the widths of the rings 404 may also vary. The size of each ring 404 can be selected based on the frequency bands targeted by that ring 404, e.g., with larger rings 404 providing coverage of lower frequencies. As also seen in FIG. 5, a distance 508 between the boundary 308 and the larger of the rings 404 may be substantially equal to a width 512 of the boundary 308.

The scope of the claims should not be limited by the embodiments set forth in the above examples, but should be given the broadest interpretation consistent with the description as a whole.

The invention claimed is:

1. An antenna assembly, comprising:

a substrate material supporting a plurality of substantially parallel conductive layers;

a ground plane defined by a first conductive layer;

an grid of antenna elements, each antenna element including:

an excitation patch defined by a second conductive layer, and configured for connection to a controller port;

a first annular radiative element defined by a third conductive layer;

a second annular radiative element defined by a fourth conductive layer;

wherein the first annular radiative element and second annular radiative element are cross-shaped; and wherein the excitation patch, the first annular radiative element, and the second annular radiative element are disposed in a stack with an axis perpendicular to the first conductive layer.

2. The antenna assembly of claim 1, wherein each antenna element further comprises:

a second excitation patch defined by the second conductive layer, the second excitation patch being orthogonal to the first excitation patch.

3. The antenna assembly of claim 1, further comprising a grounded boundary structure surrounding each of the antenna elements in the grid.

4. The antenna assembly of claim 3, wherein the boundary structure is defined by the second conductive layer.

5. The antenna assembly of claim 1, wherein a perimeter of the first annular radiative element is smaller than a perimeter of the second annular radiative element.

6. The antenna assembly of claim 1, wherein each antenna element further comprises:

a third annular radiative element defined by a further conductive layer.

7. The antenna assembly of claim 1, wherein the grid includes a four-by-four grid of antenna elements.

8. An antenna element, comprising:

a ground plane defined by a first conductive layer;

an excitation patch defined by a second conductive layer, and configured for connection to a controller port;

a first annular radiative element defined by a third conductive layer;

a second annular radiative element defined by a fourth conductive layer;

wherein the first annular radiative element and second annular radiative element are cross-shaped; and wherein the excitation patch, the first annular radiative element, and the second annular radiative element are disposed in a stack with an axis perpendicular to the first conductive layer.

* * * * *